Aug. 19, 1941.  J. SCHADEK  2,252,948
GARBAGE AND TRASH DISPOSAL BOAT
Filed Jan. 20, 1939
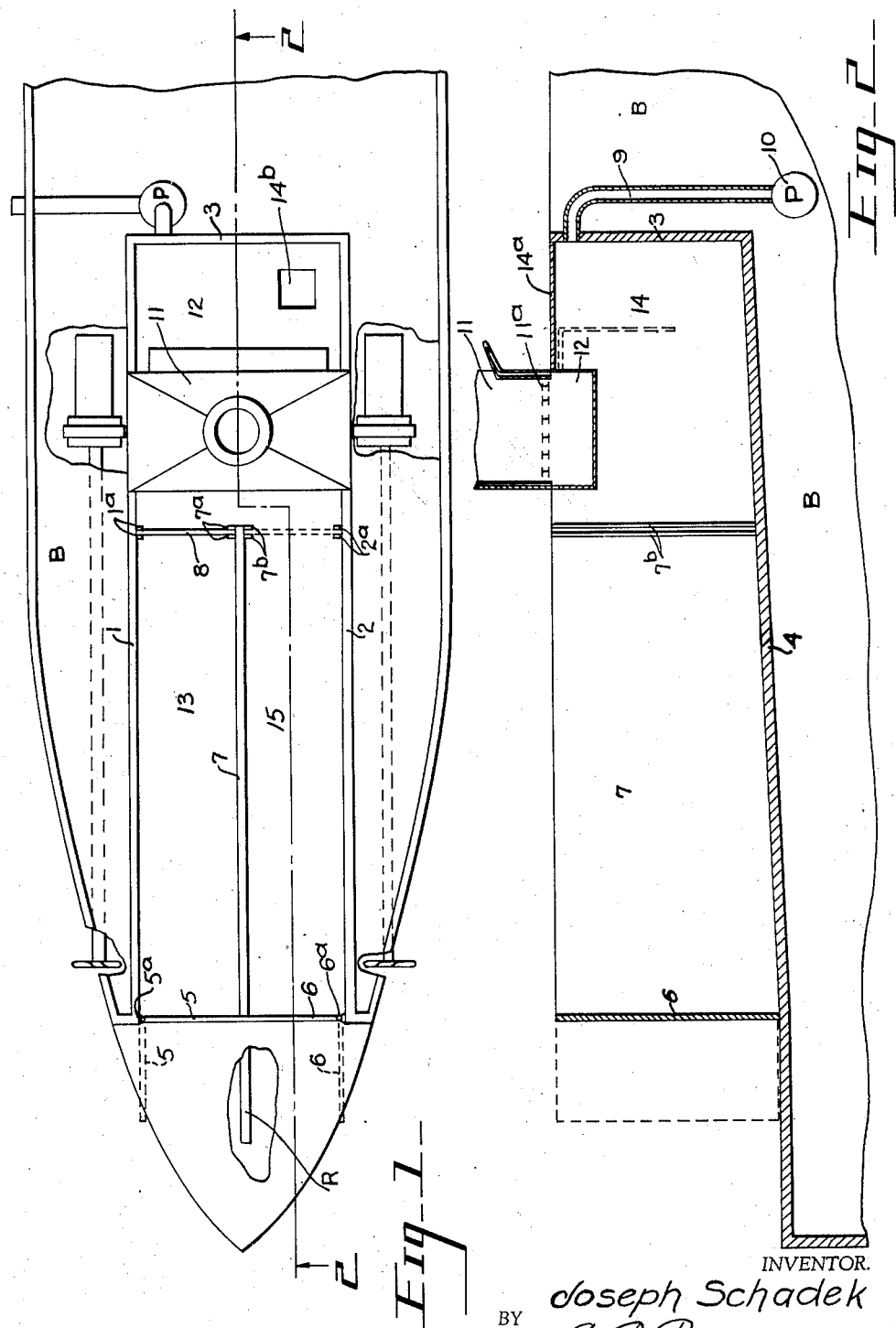
INVENTOR.
Joseph Schadek
BY A.B.Bowman
ATTORNEY.

Patented Aug. 19, 1941

2,252,948

UNITED STATES PATENT OFFICE 2,252,948

GARBAGE AND TRASH DISPOSAL BOAT

Joseph Schadek, San Diego, Calif.

Application January 20, 1939, Serial No. 251,968

8 Claims. (Cl. 114—0.5)

My invention relates to garbage and trash disposal boats, particularly adapted for the disposing of garbage and trash from ships anchored in a bay or inland waters so that the garbage cannot be dumped in said bay or inland waters. In such cases it is necessary to take the garbage and other trash from the ship out to sea some twenty miles into the ocean and dump the same and this boat is for that purpose and the objects of my invention are:

First, to provide means for receiving and storing the garbage, known as wet garbage, in pits in the boat until sufficient garbage has accumulated so that it is ready to take it out to sea;

Second, to provide a boat of this class in which the boat is unloaded while it is moving in the water;

Third, to provide a boat of this class in which water is pumped from the ocean to float the garbage from the pit in the boat into the ocean;

Fourth, to provide a boat of this class in which the pit is partitioned and divided into two portions and the portions unloaded separately by floating in water;

Fifth, to provide a boat of this class with an incinerator for burning the trash and dumping the ashes into the pit in the boat;

Sixth, to provide a novel means of unloading garbage from a boat; and

Seventh, to provide a means of this class which is very simple and economical of construction, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of a fragmentary rear end portion of my garbage and trash disposal boat and showing by dash lines varying positions of the control gates; and Fig. 2 is a longitudinal sectional view taken from the line 2—2 of Fig. 1.

Similar characters of reference refer to similar parts and portions throughout the views of the drawing:

The pit side walls 1 and 2, pit end wall 3, pit bottom 4, pit end gates 5 and 6, partition 7, pit shiftable gate 8, water supply conductor 9, water supply pump 10, incinerator 11, and incinerator ash trap 12 constitute the principal parts and portions of my garbage and trash disposal boat.

The boat body B may be any conventional type of self-propelled boat with suitable motor for propelling the same, not shown. The aft end of the boat B is provided with a garbage receiving pit which is provided with side walls 1 which extend from near the aft end of the boat forwardly to near the middle of the boat and connects with an end wall 3 and on opposite sides from the wall 1 is another side wall 2 and this pit is provided with a bottom 4 which tapers slightly from the front end downwardly toward the back. This bottom 4 is slightly above the normal water level of the boat so that the water does not come into the pit from the outside when the boat is loaded. The pit is provided from near its rear side forwardly more than one-half of the length of the pit with a middle partition 7 substantially the same heighth as the side walls 1 and 2. This partition 7 is rigidly secured in upright position therein. Pivotally connected to the side wall 1 at its rear side is a gate 5 hinged at 5a and extending over to the end of the partition 7 and adapted to swing straight back as shown by dash lines in Fig. 1 of the drawing and pivotally connected to the rear end of the side wall 2 is another similar gate 6 hinged at 6a and adapted to swing straight back as shown by dash lines in Fig. 1. Positioned centrally of the boat and extending straight back from the partition is a rudder R for controlling the direction of the movement of the boat in conventional manner. Secured on the inner side of the wall 1 are cleats 1a in spaced relation to each other, and secured on the partition 7 are cleats 7a positioned in spaced relation to each other. These cleats are arranged to receive a sliding gate 8 for closing the pit portion 13 from the main pit portion 14 and separating it from the pit portion 15. The pit side wall 2 is also provided with a pair of spaced cleats 2a and the partition 7 provided with spaced cleats 7b for receiving the gate 8 as shown by dash lines in Fig. 1 of the drawing. The doors 5 and 6 are supported at their free sides when closed by means of a lug 7a which extends down into the bottom 4 and is secured on its upper side on the partition 7. Mounted over the pit portion 12 just in front of the front end of the partition 7 is an incinerator for burning trash which may be of any conventional type, but is preferred to be of the structure as disclosed in my companion patent application for Trash incinerator for boats or the like. This trash incinerator is provided with grates 11a and under the grates is provided an ash trap box 12. This ash trap 12 is pivotally mounted on the lower side of the incinerator 11 at one side and is adapted to be dumped so that its contents is dropped into the pit portion 14. Communicating at the upper side of this pit portion 14 at the front side and in the front wall 3 is the water supply conductor 9 which communicates with the outlet of a pump 10 the inlet of which pump communicates with the water through the side wall of the boat B. The upper side of the pit 14 is covered with a floor 14a in front of the incinerator 11 and this cover is provided with a trap door 14b which may be opened for dumping cans or other trash that will not burn down into the pit 14 if desired.

The operation of my garbage and trash disposal boat is substantially as follows:

The boat B is anchored at any suitable place, preferably close to a wharf and garbage and trash are gathered from boats in a bay or other inland harbor or the inland water harbor and the wet garbage is dumped from the boats by a crane or otherwise into the pits 13 and 15, while the dry trash is dumped on the boat deck in front of the incinerator 11. The dry trash is burned in the incinerator and that that cannot be burned is placed down through the door 14b into the pit 14. This is done from day to day until the pits 13 and 15 are substantially full and the pit 14 is partially full of ashes and trash that will not burn, the gates 5 and 6 being closed and fastened. Then the boat is operated out into the ocean or other place where the garbage and trash is to be dumped. When the boat is at the location for dumping, the pump P is started and water is pumped from the ocean or other body of water to the conductor 9 into the front upper side of the pit 14, the gate 8 being positioned so as to close the front end of either the pits 13 or 15, one only and the gates 5 and 6 opened as shown by dash lines in Fig. 1 of the drawing. The wet garbage in the pit open at the front side forms a dam for the water. Therefore the water raises in the pit 14 until it is high enough and sufficient pressure is produced to float the wet garbage in the open pit and in the pit 14 out through the back end through the gate opening. As soon as it is floated out the gate 8 is then changed to in front of the other pit and the water then accumulates in the pit 14 supported by the dam of the garbage in the other pit until it is floated out and the boat B then returns to its base of operation.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

Having thus described my invention, what I claim as new and desire to secure by Letters Patent is:

1. A garbage and trash disposal boat having propelling means adjacent the rear end thereof, a pit extending longitudinally of the hull and opening outwardly through the rear end thereof, a gate for closing said opening, a second gate of substantially the same size as a cross section of said pit spaced rearwardly from the forward end of the pit and forwardly from the first mentioned gate, pump means within the hull for filling the space between the second-mentioned gate and the forward end of the hull, means for opening the gates thereby permitting water in the space above mentioned to flood out garbage located between the gates.

2. A boat as claimed in claim 1 including incinerator means positioned over the space between the second mentioned gate and the forward end of the pit opening into said space whereby ashes therefrom may drop into and flood out with the water.

3. A trash and garbage disposal boat having propelling means adjacent its rear end, a pit formed therein and extending longitudinally of the hull and opening outwardly through the rear end thereof, a vertical partition positioned substantially along the center line of said pit and extending longitudinally thereof, the partition extending from the rear end of the pit and terminating short of the front end of the pit therebetween, gates positioned at each end of and on each side of the partition respectively for closing the pit at both ends of the partition thereby providing a plurality of spaces for garbage, means for filling the space forward of the partition with water and means for opening said gates thereby permitting water in the last mentioned space to flood out garbage from the other spaces.

4. A boat as claimed in claim 3 including incinerator means positioned over the space between the forward end of the partition and pit respectively opening into said space whereby ashes therefrom may drop into and flood out with water.

5. A garbage and trash disposal boat having a pit extending longitudinally of the hull and opening outwardly through the rear end thereof, a gate for closing said opening, a second gate rearwardly spaced from the forward end of the pit and forwardly from the first mentioned gate, pump means on the hull for filling the space between the second mentioned gate and the forward end of the hull for flooding out garbage located in the pit when the gates are open.

6. A garbage and trash disposal boat having a pit extending longitudinally of the hull and opening outwardly through the rear end thereof, a gate for closing said opening, a second gate rearwardly spaced from the forward end of the pit and forwardly from the first mentioned gate, pump means on the hull for filling the space between the second mentioned gate and the forward end of the hull for flooding out garbage located in the pit when the gates are open, and incinerator means positioned over the space between the second mentioned gate and the forward end of the pit opening into said space whereby ashes from said incinerator may drop into and flood out with the water.

7. A trash and garbage disposal boat having a pit formed therein and extending longitudinally of the hull and opening outwardly through the rear end thereof, said pit provided with a longitudinally partitioned portions, said partitioned portions extending from the rear end of the pit and terminating short of the front end of the pit, thereby providing a space between the partitioned portions and the front end of the pit, a gate positioned at the rear end of each partitioned portion for closing the rear end of the pit, gates for the front end of said partitioned portions, means for filling the space forward of the partitioned portions with water to flood out garbage from the partitioned portions when the gates are opened relatively to said portions.

8. A trash and garbage disposal boat having a pit formed therein and extending longitudinally of the hull and opening outwardly through the rear end thereof, said pit provided with a longitudinally partitioned portions, said partitioned portions extending from the rear end of the pit and terminating short of the front end of the pit, thereby providing a space between the partitioned portions and the front end of the pit, a gate positioned at the rear end of each partitioned portion for closing the rear end of the pit, gates for the front end of said partitioned portions, means for filling the space forward of the partitioned portions with water to flood out garbage from the partitioned portions when the gates are opened relatively to said portions, and incinerator means positioned over the space between the forward end of said partitioned portions and the forward end of the pit opening into the space whereby ashes from said incinerator may drop into and flood out with the water.

JOSEPH SCHADEK.